J. HOPKINSON.
KNIFE EDGE BEARING.
APPLICATION FILED JUNE 16, 1911.
1,012,641.
Patented Dec. 26, 1911.
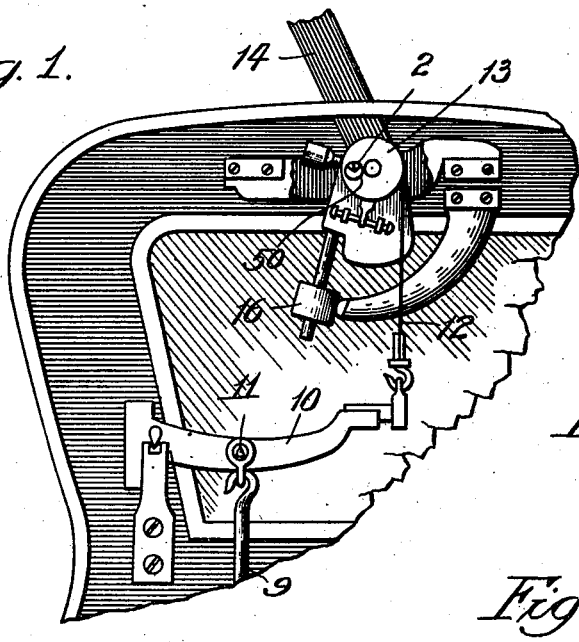
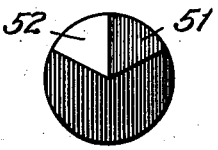
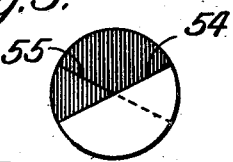
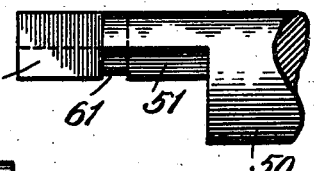
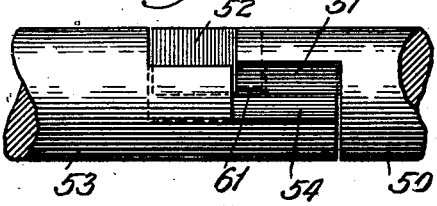
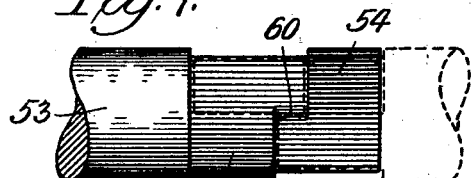
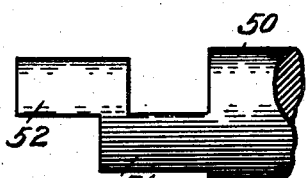
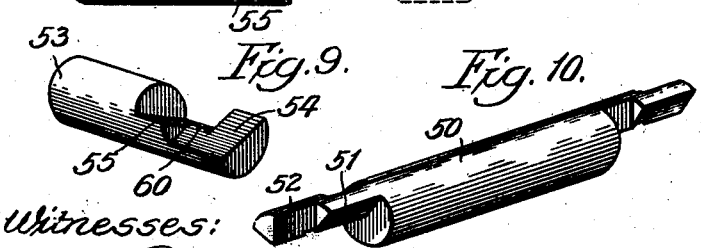
Witnesses:
John Enders
Henry A. Parks
Inventor:
Joseph Hopkinson,
by Sheridan, Wilkinson, Scott & Richmond
Attys

UNITED STATES PATENT OFFICE.

JOSEPH HOPKINSON, OF DAYTON, OHIO.

KNIFE-EDGE BEARING.

1,012,641.  Specification of Letters Patent.  Patented Dec. 26, 1911.

Application filed June 16, 1911. Serial No. 633,577.

*To all whom it may concern:*

Be it known that I, JOSEPH HOPKINSON, a citizen of the United States, residing at Dayton, in the county of Montgomery and State of Ohio, have invented certain new and useful Improvements in Knife-Edge Bearings, of which the following is a specification.

The object of my invention is to provide an improved knife edge bearing for use in weighing scales and adapted for use also in any connection in which it is desired that a moving part of a mechanical structure be so mounted as to be sensitive to the application of a force of small magnitude. I will direct the description of my invention to its application to a weighing scale. In weighing scale structures it is the almost universal practice to provide the moving parts with fulcrums in the form of a knife edge coacting with a bearing, the knife edge being usually constructed of steel and the coacting bearing of some other hard substance such as agate, or hardened steel.

As a result of long experience, scale makers have found that knife edges formed to an angle of about 60 degrees resting upon bearings having a notch, the sides of which diverge at about 100 degrees, give the best results. Of course, more or less variation from these precise angles is found in practice, but the variation is limited by two conditions. If the angle of the knife edge is made too acute it will wear away rapidly, thus interfering with the sensitiveness of the scale and also altering the proper relation of the different parts. If the notch in the bearing plate upon which the knife rests is formed at too wide an angle the knife edge when rotated to a considerable extent will slip from its proper position.

In certain instances, especially in the construction of pendulum scales, it is necessary to provide for a wider range of angular movement between the knife edge and its bearing than is possible when the knife edge is constructed with the approved degree of acutenesss. In order to secure a sufficient degree of relative rotation between the knife edge and its bearing however, it has heretofore been found necessary to reduce the angle of the knife edge down to about 30 degrees, thus introducing an objectionable degree of wear. It will be obvious, of course, that the sharper or more acute the knife edge is made the more rapidly will the use of the structure wear the knife edge toward its base. In the pendulum scale this rapid wear is objectionable for the reason that it increases the length of the pendulum, thereby destroying the accuracy of the scale. In the pendulum scale, however, it is necessary to secure a degree of angular movement of the pendulum which has heretofore rendered it impossible to employ a knife edge with an angle of much over 30 degrees. The greater angular movement desired could not be secured by increasing the angle of the notch in the bearing with which the knife edge coacts, for the reason that an increase of this angle beyond the limits of the usual practice would result in the knife edge slipping out of its seat at the apex of the angle in its bearing when the knife edge was rotated to an extreme position.

The object of my invention is to construct a knife edge and bearing of such form that the knife edge may have the usual approved angle of about 60 degrees and still have a large extent of angular movement without danger of slipping from its seat in the bearing. The means whereby I accomplish this object will more clearly appear from the following description and claims, taken in connection with the accompanying drawings, in which—

Figure 1 is a view of a part of a weighing scale similar to that shown in Patent No. 867,671, granted on October 8, 1907, to O. O. Ozias and J. Hopkinson, and illustrates a type of mechanism to which my invention is applicable. Fig. 2 is an end view of the knife edge element. Fig. 3 is an end view of the bearing element. Fig. 4 is a side view of the knife edge element and bearing element in coöperative relation to each other. Figs. 5 and 6 show the knife edge element and bearing element separated, but viewed from the same direction as in Fig. 4. Fig. 7 is a side view of the knife edge element and bearing element in coöperative relation, but viewed from a position substantially at right angles to that shown in Fig. 4. Fig. 8 is a view of the knife edge element alone and viewed from the same direction as in Fig. 7. Fig. 9 is a perspective view of the bearing. Fig. 10 is a perspective view of the knife edge element. Fig. 11 is a plan view of a modified form of bearing.

The type of scale illustrated in Fig. 1 is explained in full in the patent to O. O. Ozias and J. Hopkinson referred to above, and an extended explanation thereof is unnecessary in this application. It is sufficient to state that the article to be weighed is placed upon a platform connected by a lever or system of levers with the link 9. The downward pull imposed upon the link 9 by the article being weighed is transmitted to the lever 10 through the knife edge 11 and is transmitted from the lever 10 to the flexible band 12 which is wound about and secured to the disk 13. The pendulum 16 is rigid with the disk 13 and the knife edges 2 projecting from the disk 13 rest upon suitable bearings secured to the frame of the scale. It will be apparent that the weight of an article placed upon the scale and drawing down upon the link 9 will cause the pendulum to rotate upon its knife edges 2 in a clockwise direction and that the amount of rotation imparted to the pendulum will bear a definite relation to the weight of the article being weighed. Secured to the disk 13 is an indicating hand 14 through which the weight and value of the article are ascertained as described in the patent to Ozias and Hopkinson above referred to.

Referring to the drawings, the knife edge element 50 is provided at each end with a two part knife edge 51—52, the edges proper of the two parts being in alinement. The sectors which form the parts 51 and 52 are disposed at an angle to each other as clearly shown in Figs. 2, 5, 8 and 10. The bearing element 53 for the knife edge element 50 has two bearing surfaces 54 and 55 disposed at an angle to each other. The angles between the planes defining the knife edges of the sectors 51 and 52 may be substantially equal to the standard angle for knife edges which is approved in scale construction. It will be apparent upon reference to Figs. 9 and 10 that if the knife edge element 50 is placed upon the bearing element 53 with the sectors 51 and 52 resting upon the surfaces 54 and 55 respectively and the knife edge element 50 be then rotated in clockwise direction until the angle of the knife edge 51 with the surface 54 is insufficient to prevent side slipping, such side slipping will still be prevented by the engagement of the knife edge 52 with the surface 55. Under such circumstances such side movement could not occur by reason of the fact that the surface 55 inclines upwardly at a sufficient angle to the knife edge 52 to prevent such movement. Therefore, the tendency to side slip caused by the rotation of the knife edge 51 upon the surface 54 will be resisted by the coaction between the knife edge 52 and the surface 55. I have thus in effect provided a flat bearing surface 54 for the knife edge 51, thus permitting of a large extent of rotation and have prevented side slipping by providing the knife edge 52 disposed at an angle to the knife edge 51 and coacting with the bearing surface 55 disposed at an angle to the bearing surface 54. As the knife edge 51 rotates and becomes inclined to its bearing surface 54 to such a degree as to endanger slipping, the knife edge 52, simultaneously rotating, occupies a position where such side slipping cannot take place without the knife edge member 50 and the pendulum or other connected part riding upward against the force of gravity on the surface 55. This, of course, effectually prevents such side slipping.

In Fig. 11 instead of showing plane surfaces 54 and 55 I have shown very obtuse notches defined by surfaces 55' and 54' meeting along the vertex 56. The angle between the surfaces 55' and between the surfaces 54' may be almost 180 degrees, or, as before stated, the angle may be altogether done away with and plane surfaces 54 and 55 used, as shown in Fig. 9.

I preferably form the bearing surfaces 54 and 55 so that they overlap one another longitudinally of the member 53, as clearly shown in Figs. 4, 6, 7 and 9. The surfaces 54 and 55 where they overlap longitudinally of the member 53 would form a sharp angle, but in order to prevent excessive wear upon the knife edge member at this point, I round the intersection of the surfaces 54 and 55, as indicated at 60 in Fig. 9. As a further precaution against uneven wear of the knife edge member 50, I recess the overlapping parts of the knife edge 52, as indicated at 61 in Fig. 5.

While I have referred to the knife edge elements and bearings herein described as being applied to the pendulum of the scale partially illustrated in Fig. 1, it will be obvious that either the knife edge and its bearing may be attached to any moving and stationary parts of a scale structure between which a wider degree of rotation is desired than would be permitted by the use of knife edges of standard angle employed with bearings of the type heretofore in use. It will also be apparent that considerable variation may be made in the precise form of the elements herein described without departing from the spirit of my invention.

What I claim is:

1. In a device of the class described, a pendulum, a knife edge and bearing supporting said pendulum, said knife edge comprising two parts the edges of which are in alinement, one part being offset angularly with respect to the other, and said bearing having two parts disposed at an angle to each other, whereby said pendulum is restrained against bodily movement throughout a wide range of angular movement.

2. In a device of the class described, a pendulum, a knife edge and bearing supporting said pendulum, said knife edge comprising two parts the edges of which are in alinement, one part being angularly offset with respect to the other, and said bearing having two plane surfaces disposed at an angle to each other, whereby said pendulum is restrained against bodily movement throughout a wide range of angular movement.

3. In a device of the class described, a knife edge comprising two parts the edges of which are in alinement, one part being offset angularly with respect to the other, said two parts overlapping each other longitudinally and being notched at the edge of the overlapping parts, and a bearing having two parts disposed at an angle to each other.

4. In a device of the class described, a knife edge comprising two parts the edges of which are in alinement, one part being offset angularly with respect to the other, and a bearing having two parts disposed at an angle to each other, the two parts of the bearing overlapping each other and being joined by a curved surface.

5. In a device of the class described, a knife edge comprising two parts 51—52, the edges of which are in alinement, one part being offset angularly with respect to the other, said two parts overlapping each other longitudinally and being notched at the edge 61 of the overlapping parts.

6. In a device of the class described, a knife edge comprising two parts 51 and 52, the edges of which are in alinement, one part being offset angularly with respect to the other, and a bearing having two parts 54—55 disposed at an angle to each other, said two parts of the bearing overlapping each other and being joined by a curved surface 60 lying below the planes of said parts 54—55.

In testimony whereof, I have subscribed my name.

JOSEPH HOPKINSON.

Witnesses:
JAMES L. BOURNE,
CARL S. COOK.